(12) United States Patent
Takimoto et al.

(10) Patent No.: US 11,919,272 B2
(45) Date of Patent: Mar. 5, 2024

(54) MULTILAYER TUBE

(71) Applicant: Sumitomo Riko Company Limited, Aichi (JP)

(72) Inventors: Yorihiro Takimoto, Aichi (JP); Koji Mizutani, Aichi (JP); Soushi Satoh, Aichi (JP); Makoto Ito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 7 days.

(21) Appl. No.: 17/313,022

(22) Filed: May 6, 2021

(65) Prior Publication Data

US 2021/0252823 A1 Aug. 19, 2021

Related U.S. Application Data

(63) Continuation of application No. PCT/JP2020/008786, filed on Mar. 3, 2020.

(30) Foreign Application Priority Data

Mar. 19, 2019 (JP) .................................. 2019-051693

(51) Int. Cl.
*B32B 1/08* (2006.01)
*B32B 3/26* (2006.01)
(Continued)

(52) U.S. Cl.
CPC ................ *B32B 1/08* (2013.01); *B32B 3/263* (2013.01); *B32B 27/08* (2013.01); *F16L 9/133* (2013.01);
(Continued)

(58) Field of Classification Search
CPC ..................................... B32B 1/08; B32B 3/263
(Continued)

(56) References Cited

U.S. PATENT DOCUMENTS 4,657,285 A * 4/1987 Akiyama ................. F16L 11/04
285/259
5,469,892 A * 11/1995 Noone ................... B29C 48/335
138/121

(Continued)

FOREIGN PATENT DOCUMENTS

CN 104939789 9/2015
DE 19508412 A1 * 9/1996 ............. F02M 55/00
(Continued)

OTHER PUBLICATIONS

"Office Action of China Counterpart Application" with English translation thereof, dated May 13, 2022, p. 1-p. 26.
(Continued)

*Primary Examiner* — Michael C Romanowski
(74) *Attorney, Agent, or Firm* — JCIPRNET

(57) ABSTRACT

A multilayer tube (1) includes: an elastic layer (11, 21, 31, 41, 51) formed over the entire length of the multilayer tube (1) and having a predetermined flexural modulus of elasticity; and a hard layer (12, 22, 32, 42, 52) formed over the entire length of the multilayer tube (1), having a flexural modulus of elasticity that is high compared to the elastic layer (11, 21, 31, 41, 51), and disposed more to an outer layer side than the elastic layer (11, 21, 31, 41, 51). A first extremity (10) of the multilayer tube (1) is formed in such a manner that the thickness (H11) of the elastic layer (11) is thicker than the thickness (H12) of the hard layer (12).

17 Claims, 3 Drawing Sheets

(51) Int. Cl.
    *B32B 27/08* (2006.01)
    *F16L 9/133* (2006.01)
    *F16L 21/00* (2006.01)
(52) U.S. Cl.
    CPC ......... *F16L 21/005* (2013.01); *B32B 2307/51* (2013.01); *B32B 2307/536* (2013.01); *B32B 2307/732* (2013.01); *B32B 2597/00* (2013.01)
(58) Field of Classification Search
    USPC ......... 428/34.1–36.92, 35.7–36.92; 138/109, 138/137, 140
    See application file for complete search history.

(56) References Cited

U.S. PATENT DOCUMENTS

| | | | | |
|---|---|---|---|---|
| 5,472,746 A * | 12/1995 | Miyajima | ............ | B29D 23/001 427/469 |
| 5,568,944 A * | 10/1996 | Kawasaki | ............ | B29C 66/114 264/513 |
| 5,588,468 A * | 12/1996 | Pfleger | ............ | F16L 11/11 138/121 |
| 5,664,608 A * | 9/1997 | Kawasaki | ............ | F16L 11/04 138/139 |
| 5,699,835 A * | 12/1997 | Nakagawa | ............ | F16L 9/133 138/141 |
| 5,918,643 A * | 7/1999 | Roloff | ............ | F16L 11/121 138/140 |
| 5,960,977 A * | 10/1999 | Ostrander | ............ | F16L 11/15 220/86.1 |
| 5,983,950 A * | 11/1999 | Aoki | ............ | F16L 25/0036 138/121 |
| 6,279,615 B1 * | 8/2001 | Iio | ............ | F16L 11/11 138/140 |
| 6,321,794 B1 * | 11/2001 | Ishida | ............ | F16L 11/118 138/121 |
| 7,478,652 B2 * | 1/2009 | Sakazaki | ............ | F16L 11/11 138/121 |
| 10,010,243 B2 | 7/2018 | Abe et al. | | |
| 2003/0099799 A1 * | 5/2003 | Koike | ............ | B32B 1/08 428/36.91 |
| 2003/0118766 A1 * | 6/2003 | Koike | ............ | B32B 1/08 428/36.91 |
| 2003/0232207 A1 * | 12/2003 | Thullen | ............ | F16L 11/118 428/476.3 |
| 2004/0193013 A1 * | 9/2004 | Iwasaka | ............ | B32B 27/32 600/140 |
| 2004/0227343 A1 * | 11/2004 | Takagi | ............ | F16L 27/111 285/903 |
| 2004/0256017 A1 * | 12/2004 | Arima | ............ | B32B 25/10 138/121 |
| 2005/0053742 A1 * | 3/2005 | Morohoshi | ............ | F16L 11/11 428/36.91 |
| 2006/0011249 A1 * | 1/2006 | Arima | ............ | F16L 11/085 138/109 |
| 2006/0220379 A1 * | 10/2006 | Arima | ............ | F16L 33/2076 285/259 |
| 2007/0012374 A1 * | 1/2007 | Yasuda | ............ | F16L 11/11 138/140 |
| 2007/0227610 A1 * | 10/2007 | Sakazaki | ............ | F16L 11/06 138/137 |
| 2008/0171163 A1 * | 7/2008 | Caviezel | ............ | B29C 49/4242 425/522 |
| 2008/0193583 A1 | 8/2008 | Kikusawa | | |
| 2008/0230136 A1 * | 9/2008 | Sakazaki | ............ | B32B 25/04 138/137 |
| 2009/0246434 A1 * | 10/2009 | Miyamoto | ............ | B32B 25/12 138/137 |
| 2009/0247826 A1 * | 10/2009 | Kida | ............ | A61B 1/00071 600/121 |
| 2010/0075075 A1 * | 3/2010 | Takahashi | ............ | A61B 1/00071 264/177.17 |
| 2010/0201029 A1 * | 8/2010 | Yago | ............ | B29C 48/34 264/260 |
| 2011/0017304 A1 * | 1/2011 | Babl | ............ | F16L 11/15 138/121 |
| 2012/0071722 A1 * | 3/2012 | Nakamura | ............ | A61B 1/00078 600/140 |
| 2012/0277530 A1 * | 11/2012 | Yamakawa | ............ | A61B 1/0008 600/114 |
| 2013/0221001 A1 * | 8/2013 | Yajima | ............ | F16L 11/11 428/36.4 |
| 2015/0202352 A1 * | 7/2015 | Watanabe | ............ | C08G 18/8025 604/523 |
| 2015/0272424 A1 * | 10/2015 | Abe | ............ | A61B 1/00078 600/140 |
| 2016/0227982 A1 * | 8/2016 | Takahashi | ............ | A61B 1/31 |
| 2018/0304741 A1 | 10/2018 | Wakazono et al. | | |
| 2020/0200296 A1 * | 6/2020 | Moon | ............ | F16L 9/006 |

FOREIGN PATENT DOCUMENTS

| | | | | |
|---|---|---|---|---|
| JP | S5346015 | | 4/1978 | |
| JP | S53105563 | | 9/1978 | |
| JP | S63158382 | | 7/1988 | |
| JP | SP 63-158382 | * | 7/1988 | ............ F16L 11/11 |
| JP | H0617056 | | 1/1994 | |
| JP | H 06-190974 | * | 7/1994 | ............ F16L 11/04 |
| JP | 2782185 | | 7/1998 | |
| JP | 2001141131 | | 5/2001 | |
| JP | 2001141131 A | * | 5/2001 | ............ F16L 55/02 |
| JP | 2003214564 | | 7/2003 | |
| JP | 3619239 | | 2/2005 | |
| JP | 2014159838 | | 9/2014 | |
| JP | 2018118498 | | 8/2018 | |
| WO | 2012031677 | | 3/2012 | |

OTHER PUBLICATIONS

"Office Action of German Counterpart Application", dated Aug. 17, 2022, with English translation thereof, pp. 1-15.
"Office Action of China Counterpart Application", dated Aug. 22, 2022, with English translation thereof, pp. 1-19.
"Office Action of China Counterpart Application" with English translation thereof, dated Sep. 3, 2021, p. 1-p. 23.
"Written Opinion of the International Searching Authority (Form PCT/ISA/237) of PCT/JP2020/008786," dated May 19, 2020, with English translation thereof, pp. 1-12.
"Office Action of China Counterpart Application" with English translation thereof, dated Feb. 17, 2022, p. 1-p. 20.
"International Search Report (Form PCT/ISA/210) of PCT/JP2020/008786," dated May 19, 2020, with English translation thereof, pp. 1-4.
"Office Action of Japan Counterpart Application" with English translation thereof, dated Jan. 10, 2023, p. 1-p. 23.
"Office Action of Japan Counterpart Application", dated May 16, 2023, with English translation thereof, pp. 1-8.

* cited by examiner

MULTILAYER TUBE

CROSS-REFERENCE TO RELATED APPLICATIONS

This application is a Continuation of PCT International Application No. PCT/JP2020/008786 filed on Mar. 3, 2020, which claims priority under 35 U.S.C. § 119(a) to Japanese Patent Application No. 2019-051693 filed on Mar. 19, 2019. The above application is hereby expressly incorporated by reference, in its entirety, into the present application.

TECHNICAL FIELD

The disclosure relates to a multilayer tube formed of an organic material.

BACKGROUND ART

Metal or hard resin tubes are used in a pipeline (a duct or a hose) through which a fluid for an automobile flow. However, when the metal or hard resin tubes are connected by being sleeved on a male type mating member, the tubes may not be able to be directly connected to the male type mating member. For this reason, there is a need to interpose a rubber hose therebetween. Fluid leakage may occur in a connecting portion between the metal or hard resin tube and the rubber hose.

In addition, when metal or hard resin tubes are connected through insertion into a female type mating member such as a connector or the like, there is no need to interpose a rubber hose therebetween. However, from the viewpoint of assemblability, the end portion is required to have flexibility.

Here, Japanese Patent Laid-Open No. 2001-141131 discloses a resin tube having a single structure portion formed of a soft resin and having a portion into which a mating member is inserted when the mating member is inserted into a tube, and multilayer structure portion constituted by a soft resin layer and a hard resin layer. In addition, Japanese Patent Laid-Open No. 2001-141131 discloses a resin tube having a single structure portion formed of a hard resin and having a portion onto which a mating member is sleeved on when the mating member sleeved on a tube, and a multilayer structure portion constituted by a soft resin layer and a hard resin layer. Further, in the resin tube, the single structure portion and the multilayer structure portion are integrally blow-molded. In addition, molding of the multilayer structure formed of a resin is disclosed in Japanese Patent Laid-Open No. S53-105563, Japanese Patent No. 3619239, Japanese Patent Publication No. H06-17056, and Japanese Patent No. 2782185.

In the resin tube disclosed in Japanese Patent Laid-Open No. 2001-141131, the soft resin layer and the hard resin layer have continuity over a range extending to the extremities. For this reason, this works more effectively for fluid leakage than when the rubber hose as in the related art is used. However, in the resin tube disclosed in Japanese Patent Laid-Open No. 2001-141131, there is a single structure portion constituted by a soft resin or a hard resin. For this reason, there is no continuity in a longitudinal direction of the resin tube with respect to the two of the hard resin layer and the soft resin layer. Accordingly, in a boundary between the single structure portion and the multilayer structure portion, strength, pressure resistance performance, impact resistance performance, or the like, may cause deterioration in performance.

SUMMARY OF INVENTION

A multilayer tube according to an embodiment of the disclosure is formed of an organic material. In the multilayer tube, a first end portion of the multilayer tube is connected to a first mating member by inserting the first mating member into the first end portion or by sleeving the first mating member on the first end portion. The multilayer tube includes an elastic layer formed throughout the entire length of the multilayer tube and having a determined flexural modulus of elasticity; and a hard layer formed throughout the entire length of the multilayer tube, having a flexural modulus of elasticity higher than that of the elastic layer and disposed as an outer layer on the side of the elastic layer.

DESCRIPTION OF EMBODIMENTS

Figure 1:
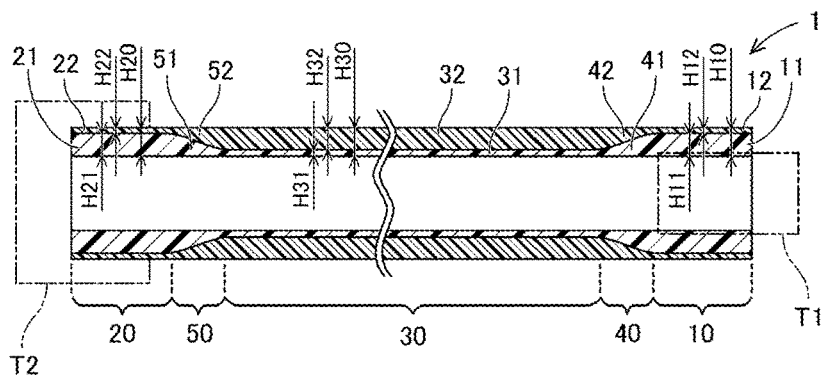
FIG. 1 is an enlarged cross-sectional view of a multilayer tube of a first example.

According to an aspect of the disclosure, there is provided a multilayer tube capable of exhibiting a desired performance over a range extending to the extremities while reducing a problem related to fluid leakage.

In the multilayer tube, both of the elastic layer and the hard layer are formed throughout the entire length of the multilayer tube. That is, the elastic layer is not interrupted in the middle, and the hard layer is also not interrupted in the middle. Accordingly, in the longitudinal direction of the multilayer tube, the elastic layer also has continuity, and the hard layer also has continuity. As a result, a problem related to fluid leakage can be solved with this better functionality.

Further, the multilayer tube according to another embodiment of the disclosure becomes a multilayer structure having at least an elastic layer and a hard layer throughout the entire length. Accordingly, the multilayer tube according to the embodiment of the disclosure has no boundary between a single structure portion and a multilayer structure portion like the multilayer tube disclosed in Patent Literature 1. In this way, since the multilayer tube according to the embodiment of the disclosure has no boundary, a desired performance can be stably exhibited.

Further, the first end portion of the multilayer tube is formed such that a thickness of the elastic layer is greater than a thickness of the hard layer. As a result, in the first end portion of the multilayer tube, connecting performance when the first mating member is connected to the first end portion becomes better. In addition, in the longitudinal direction of the multilayer tube, each of the thickness of the elastic layer and the thickness of the hard layer varies. As a result, the thickness of the elastic layer and the thickness of the hard layer in the multilayer tube can be varied according to the purpose of the area. Accordingly, a desired performance can be provided throughout the entire length of the multilayer tube.

(1. Application Target)

A multilayer tube is applied to, for example, pipelines for an automobile. The pipelines for an automobile to which the multilayer tube can be applied include a turbo intake duct, an air blow duct, a water pipeline, a fuel pipeline, and the like. Various fluids such as air, water, fuel, and the like, can be applied as the fluid flowing therethrough.

In addition, both of end portions of the multilayer tube are connected to a mating member. Any one of a member inserted into an end portion of the multilayer tube and a member sleeved on an end portion of the multilayer tube may be applied as a mating member. The mating member may be inserted into or may be sleeved on both of the end portions of the multilayer tube. In addition, a first mating member may be inserted into a first end portion of a multilayer tube, and a second mating member may be sleeved on a second end portion of the multilayer tube.

In addition, the multilayer tube may be a linear tube or a curved tube. Further, the multilayer tube may be formed in a non-bellows shape throughout the entire length or may be formed in a bellows shape in at least a part in a longitudinal direction.

(2. Multilayer Tube 1 of First Example)

A multilayer tube 1 of a first example will be described with reference to FIGS. 1 and 2. The multilayer tube 1 includes a first end portion 10 disposed on the right side in FIGS. 1 and 2, a second end portion 20 disposed on the left side in FIGS. 1 and 2, and an intermediate part 30 disposed between the first end portion 10 and the second end portion 20. Further, the multilayer tube 1 is exemplarily constituted by a first connecting part 40 that forms a boundary portion between the first end portion 10 and the intermediate part 30, and a second connecting part 50 that forms a boundary portion between the second end portion 20 and the intermediate part 30. Further, the multilayer tube 1 may have a configuration in which the first connecting part 40 and the second connecting part 50 are not present.

Figure 2:
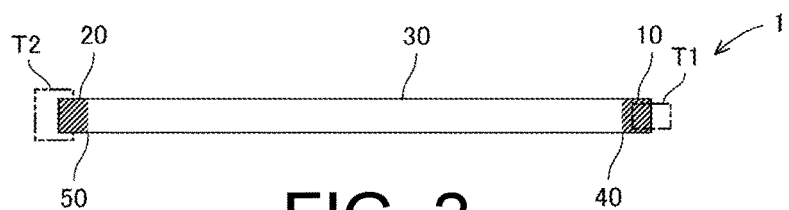
FIG. 2 is a front view of the multilayer tube of the first example, in which an area with a thick elastic layer is hatched.

As shown in FIG. 2, the first end portion 10 is formed in a non-bellows shape throughout the entire length. Further, in the example, the first end portion 10 is formed in a linear shape. The first end portion 10 is connected to a first mating member T1. In the example, the first mating member T1 may be exemplified as a male member. Accordingly, the first end portion 10 of the multilayer tube 1 is connected to the first mating member T1 by inserting the first mating member T1 that is a male member into the first end portion 10. However, the first mating member T1 may also be a female member.

As shown in FIG. 2, the second end portion 20 is formed in a non-bellows shape throughout the entire length. Further, in the example, the second end portion 20 is formed in a linear shape. The second end portion 20 is connected to a second mating member T2. In the example, the case in which the second mating member T2 is a female member is exemplified. Accordingly, the second end portion 20 of the multilayer tube 1 is connected to the second mating member T2 by sleeving the second mating member T2 that is a female member on the second end portion 20. However, like the first mating member T1, the second mating member T2 may also be a male member.

As shown in FIG. 2, the intermediate part 30 is formed in a non-bellows shape throughout the entire length. Further, in the example, the intermediate part 30 is constituted by a linear part (an area formed in a linear shape). However, the intermediate part 30 need not be constituted by only a linear part, and may be constituted by a linear part and a curved part (a curved area) or may be constituted by only a curved part.

As shown in FIG. 1, the multilayer tube 1 has a multilayer structure formed of different organic materials. In the example, while the case in which the multilayer tube 1 has a 2-layer structure is exemplified, three or more layers may be provided. The multilayer tube 1 includes tubular elastic layers 11, 21, 31, 41 and 51 formed as an innermost layer, and tubular hard layers 12, 22, 32, 42 and 52 formed as an outer layer side.

The elastic layers 11, 21, 31, 41 and 51 are continuously formed throughout the entire length of the multilayer tube 1. The elastic layers 11, 21, 31, 41 and 51 have a determined flexural modulus of elasticity. The determined flexural modulus of elasticity is a modulus of elasticity such that flexibility and elasticity are provided. That is, the elastic layers 11, 21, 31, 41 and 51 are formed of an organic material that is soft.

The elastic layers 11, 21, 31, 41 and 51 are formed of a resin or elastomer. In the elastic layers 11, 21, 31, 41 and 51, for example, a polyolefin resin (polyethylene, polypropylene), an aliphatic polyamide (PA46, PA6, PA66, PA610, PA612, PA1010, PA1012, PA11, PA12), a semi-aromatic polyamide (PA4T, PA6T, PA9T, PA10T, PA11T, MXD6), a polyester resin (PET, PBT, PBN), polyphenylene sulfide (PPS), ethylene-vinyl alcohol copolymer (EVOH), a fluorine resin (ETFE, PVDF, PFA), polyacetal (POM), vinyl chloride resin (PVC), polymethylpentene resin (TPX), or syndiotactic polystyrene resin (SPS) may be applied as the resin.

In addition, in the elastic layers 11, 21, 31, 41 and 51, for example, a non-cross-linked olefin-based thermoplastic elastomer (TPO), a cross-linked olefin-based thermoplastic elastomer (TPV), a polyester-based thermoplastic elastomer (TPEE), a polyimide-based thermoplastic elastomer (TPAE), a urethane-based thermoplastic elastomer (TPU), a vinyl chloride-based thermoplastic elastomer (TPVC), a fluorine-based thermoplastic elastomer, or a styrene-based thermoplastic elastomer (TPS) may be applied as the elastomer.

Here, as shown in FIG. 1, the elastic layers 11, 21, 31, 41 and 51 may be a single layer structure formed of a type of elastic material. In addition, the elastic layers 11, 21, 31, 41 and 51 may be a multilayer structure formed of different elastic materials.

The hard layers 12, 22, 32, 42 and 52 are continuously formed throughout the entire length of the multilayer tube 1. The hard layers 12, 22, 32, 42 and 52 are disposed on the side of the outer layer of the elastic layers 11, 21, 31, 41 and 51. The hard layers 12, 22, 32, 42 and 52 have a flexural modulus of elasticity higher than that of the elastic layers 11, 21, 31, 41 and 51.

The hard layers 12, 22, 32, 42 and 52 are formed of a resin or elastomer. The resin and elastomer that are applicable to the elastic layers 11, 21, 31, 41 and 51 can be applied to the hard layers 12, 22, 32, 42 and 52. However, for the elastic layers 11, 21, 31, 41 and 51 and the hard layers 12, 22, 32, 42 and 52, the flexural modulus of elasticity may be different, and the same type of organic material may be applied.

Here, as shown in FIG. 1, the hard layers 12, 22, 32, 42 and 52 may be a single layer structure formed of a type of hard material. In addition, the hard layers 12, 22, 32, 42 and 52 may be a multilayer structure formed of different hard materials.

In the longitudinal direction of the multilayer tube 1, thicknesses H11, H21 and H31 of the elastic layers 11, 21, 31, 41 and 51 and thicknesses H12, H22 and H32 of the hard layers 12, 22, 32, 42 and 52 vary. Hereinafter, the thicknesses of the areas will be described in detail. Here, in the first example, the case in which total thicknesses H10, H20 and H30 of the multilayer tube 1 are the same throughout the entire length is exemplified.

As shown in FIG. 1, the first end portion 10 is formed such that the thickness H11 of the elastic layer 11 is greater than the thickness H12 of the hard layer 12. Further, in the longitudinal direction of the first end portion 10, the thickness H11 of the elastic layer 11 is uniform, and the thickness H12 of the hard layer 12 is also uniform. However, each of the thicknesses H11 and H12 may vary.

The first mating member T1 that is a male member is inserted into the first end portion 10. The elastic layer 11 is adhered to an outer circumferential surface of the first mating member T1, and the first end portion 10 is connected to the first mating member T1. Accordingly, the first end portion 10 has an excellent holding strength and there is excellent sealability between the first mating member T1 and the first end portion 10 according to an action of the elastic layer 11.

Further, the elastic layer 11 is compressed in the radial direction by the inner circumferential surface of the hard layer 12 and the outer circumferential surface of the first mating member T1. Here, in the first end portion 10, the hard layer 12 has the thickness H12 such that a force can be exerted to hold the elastic layer 11 in a state in which it is compressed. Then, the first end portion 10 is connected to the first mating member T1 as the elastic layer 11 is compressed. That is, a better holding power is provided and better sealability is provided according to compression of the elastic layer 11.

Here, the first end portion 10 may have bendable flexibility. The first end portion 10 can be made to have such properties due to the hard layer 12 having the thickness H12 such that bendable flexibility is provided. Since the first end portion 10 has such properties, the first end portion 10 has a state similar to that of a rubber hose, and the first end portion 10 is easily attached to the first mating member T1.

The second end portion 20 is formed such that the thickness H21 of the elastic layer 21 is greater than the thickness H22 of the hard layer 22. Further, in the longitudinal direction of the second end portion 20, the thickness H21 of the elastic layer 21 is the same, and the thickness H22 of the hard layer 22 is also the same. However, each of the thicknesses H21 and H22 may be varied.

The second mating member T2 that is a female member is sleeved on the second end portion 20. In addition, in the second end portion 20, the hard layer 22 is formed as the outermost layer. Then, in the second end portion 20, the hard layer 22 is welded or locked to the second mating member T2. In the second end portion 20, the hard layer 22 is formed as the outermost layer, and a high connecting strength with respect to the second mating member T2 can be exhibited.

However, in the second end portion 20, the elastic layer 21 that is thick is formed as the innermost layer. Accordingly, the second end portion 20 can have bendable flexibility. Since the hard layer 22 has the thickness H22 such that the bendable flexibility is provided, the second end portion 20 can have the corresponding properties. Since the second end portion 20 has the corresponding properties, the second end portion 20 has a state similar to the rubber hose, and the second end portion 20 is easily attached to the second mating member T2.

The intermediate part 30 is formed such that the thickness H31 of the elastic layer 31 is smaller than the thickness H32 of the hard layer 32 throughout the entire length. Further, in the longitudinal direction of the intermediate part 30, the thickness H31 of the elastic layer 31 is the same, and the thickness H32 of the hard layer 32 is also the same. However, each of the thicknesses H31 and H32 may be varied.

In addition, the thickness H32 of the hard layer 32 in the intermediate part 30 is sufficiently greater than the thicknesses H12 and H22 of the hard layers 12 and 22 in the first end portion 10 and the second end portion 20. Accordingly, the intermediate part 30 can exhibit the same function as the pipeline formed of only a hard layer or the pipeline formed of a metal. That is, the intermediate part 30 may be configured to have a predetermined bending rigidity or more.

In addition, in the intermediate part 30, the elastic layer 31 that is thin is formed on the side of the inner layer. Durability of the intermediate part 30 can be increased according to presence of the elastic layer 31. In the intermediate part 30, an impact absorbing strength can be improved and durability can be increased according to the presence of the thin elastic layer 31 in comparison with the case of a hard material only.

The first connecting part 40 constitutes a boundary portion between the first end portion 10 and the intermediate part 30. Further, in the first connecting part 40, the elastic layer 41 continuously connects the elastic layer 11 of the first end portion 10 and the elastic layer 31 of the intermediate part 30. That is, the elastic layer 41 has a thickness that gradually varies. In addition, in the first connecting part 40, the hard layer 42 continuously connects the hard layer 12 of the first end portion 10 and the hard layer 32 of the intermediate part 30. That is, the hard layer 42 has a thickness that changes gradually. Accordingly, it is possible to reduce an influence due to rapid variation in each of the layers 41 and 42.

The second connecting part 50 configures a boundary portion between the second end portion 20 and the intermediate part 30. Then, in the second connecting part 50, the elastic layer 51 continuously connects the elastic layer 21 of the second end portion 20 and the elastic layer 31 of the intermediate part 30. That is, the elastic layer 51 has a thickness that is gradually varied. In addition, in the second connecting part 50, the hard layer 52 continuously connects the hard layer 22 of the second end portion 20 and the hard layer 32 of the intermediate part 30. That is, the hard layer 52 has a thickness that is gradually varied. Accordingly, it is possible to reduce a bad influence due to a rapid variation in each of the layers 51 and 52.

As described above, in the multilayer tube 1, both of the elastic layers 11, 21, 31, 41 and 51 and the hard layers 12, 22, 32, 42 and 52 are formed throughout the entire length of the multilayer tube. That is, the elastic layers 11, 21, 31, 41 and 51 are not interrupted in the middle, and the hard layers 12, 22, 32, 42 and 52 are also not interrupted in the middle. Accordingly, in the longitudinal direction of the multilayer tube 1, the elastic layers 11, 21, 31, 41 and 51 have continuity, and the hard layers 12, 22, 32, 42 and 52 also have continuity. As a result, a problem related a fluid leakage can be solved with higher functionality.

Further, the multilayer tube 1 has a multilayer structure having at least the elastic layers 11, 21, 31, 41 and 51 and the hard layers 12, 22, 32, 42 and 52 throughout the entire length. Accordingly, the multilayer tube 1 does not have a boundary between the single structure portion and the multilayer structure portion like the resin tube in the related art. In this way, since the multilayer tube 1 has no boundary, a desired performance can be stably exhibited.

Further, the first end portion 10 of the multilayer tube 1 is formed such that the thickness H11 of the elastic layer 11 is greater than the thickness H12 of the hard layer 12. As a result, in the first end portion 10 of the multilayer tube 1, a connecting performance when the first end portion 10 is connected to the first mating member T1 is improved.

In addition, the second end portion 20 of the multilayer tube 1 is formed such that the thickness H21 of the elastic layer 21 is greater than the thickness H22 of the hard layer 22. As a result, in the second end portion 20 of the multilayer tube 1, connecting performance when the second end portion 20 is connected to the second mating member T2 is improved.

In addition, in the longitudinal direction of the multilayer tube 1, the thicknesses H11, H21 and H31 of the elastic layers 11, 21, 31, 41 and 51 and the thicknesses H12, H22 and H32 of the hard layers 12, 22, 32, 42 and 52 are varied. As a result, the thicknesses H11, H21 and H31 of the elastic layers 11, 21, 31, 41 and 51 and the thicknesses H12, H22 and H32 of the hard layers 12, 22, 32, 42 and 52 of the multilayer tube 1 can be varied according to the purpose of the area. Accordingly, desired performance can be provided throughout the entire length of the multilayer tube 1.

(3. Multilayer Tube 2 of Second Example)

Figure 3:
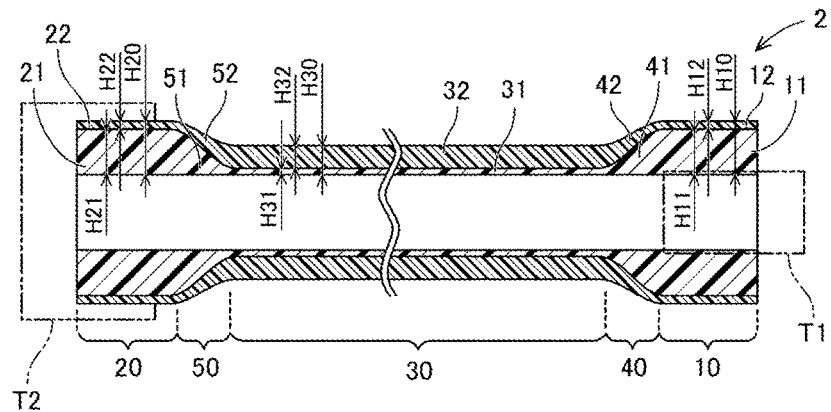
FIG. 3 is an enlarged cross-sectional view of a multilayer tube of a second example.

A multilayer tube 2 of a second example will be described with reference to FIG. 3. The multilayer tube 2 includes the first end portion 10 and the second end portion 20 that have the configuration different from those of the multilayer tube 1 of the first example.

The total thickness H10 of the first end portion 10 is greater than the total thickness H30 of the intermediate part 30. The total thickness H20 of the second end portion 20 is also greater than the total thickness H30 of the intermediate part 30. In the first end portion 10, the thickness H11 of the elastic layer 11 is greater than the thickness H12 of the hard layer 12. In the second end portion 20, the thickness H21 of the elastic layer 21 is greater than the thickness H22 of the hard layer 22. In the intermediate part 30, the thickness H31 of the elastic layer 31 is smaller than the thickness H32 of the hard layer 32.

The thickness H12 of the hard layer 12 in the first end portion 10 is smaller than the thickness H32 of the hard layer 32 in the intermediate part 30. Accordingly, a ratio (H11/H10) of the thickness H11 of the elastic layer 11 with respect to the total thickness H10 of the first end portion 10 in the first end portion 10 is greater than a ratio (H32/H30) of the thickness H32 of the hard layer 32 with respect to the total thickness H30 of the intermediate part 30 in the intermediate part 30. On the other hand, a ratio (H12/H10) of the thickness H12 of the hard layer 12 with respect to the total thickness H10 of the first end portion 10 in the first end portion 10 is smaller than a ratio (H31/H30) of the thickness H31 of the elastic layer 31 with respect to the total thickness H30 of the intermediate part 30 in the intermediate part 30.

The second end portion 20 is also similar to the first end portion 10. That is, the thickness H22 of the hard layer 22 in the second end portion 20 is smaller than the thickness H32 of the hard layer 32 in the intermediate part 30. Accordingly, a ratio (H21/H20) of the thickness H21 of the elastic layer 21 with respect to the total thickness H20 of the second end portion 20 in the second end portion 20 is greater than a ratio (H32/H30) of the thickness H32 of the hard layer 32 with respect to the total thickness H30 of the intermediate part 30 in the intermediate part 30. On the other hand, a ratio (H22/H20) of the thickness H22 of the hard layer 22 with respect to the total thickness H20 of the second end portion 20 in the second end portion 20 is smaller than a ratio (H31/H30) of the thickness H31 of the elastic layer 31 with respect to the total thickness H30 of the intermediate part 30 in the intermediate part 30.

The thicknesses H12 and H22 of the hard layers 12 and 22 in the first end portion 10 and the second end portion 20 are smaller than the thickness H32 of the hard layer 32 of the intermediate part 30. For this reason, strength of the first end portion 10 and the second end portion 20 may be more greatly decreased than that of the intermediate part 30.

However, in the multilayer tube 2 of the second example, the total thicknesses H10 and H20 of the first end portion 10 and the second end portion 20 are greater than the total thickness H30 of the intermediate part 30. Then, an extent of a decrease in strength due to the hard layers 12 and 22 is reinforced by increasing the thicknesses H11 and H21 of the elastic layers 11 and 21. Accordingly, the first end portion 10 as a whole can have substantially the same strength as that of the intermediate part 30. The second end portion 20 is also similar thereto.

(4. Multilayer Tube 3 of Third Example)

Figure 4:
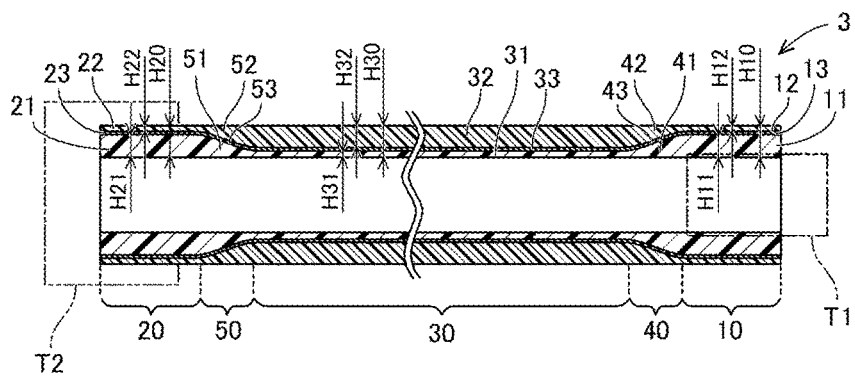
FIG. 4 is an enlarged cross-sectional view of a multilayer tube of a third example.

A multilayer tube 3 of a third example will be described with reference to FIG. 4. The multilayer tube 3 further includes tubular adhesive layers 13, 23, 33, 43 and 53 in addition to the multilayer tube 1 of the first example.

The adhesive layers 13, 23, 33, 43 and 53 are continuously formed throughout the entire length of the multilayer tube 3. The adhesive layers 13, 23, 33, 43 and 53 are formed between the elastic layers 11, 21, 31, 41 and 51 and the hard layers 12, 22, 32, 42 and 52 in the radial direction, and attach the elastic layers 11, 21, 31, 41 and 51 and the hard layers 12, 22, 32, 42 and 52. The adhesive layers 13, 23, 33, 43 and 53 have a uniform thickness throughout the entire length.

The flexural modulus of elasticity of the adhesive layers 13, 23, 33, 43 and 53 may be the same as the flexural modulus of elasticity of the elastic layers 11, 21, 31, 41 and 51, may be the same as flexural modulus of elasticity of the hard layers 12, 22, 32, 42 and 52, or may be between the flexural modulus of elasticity of the elastic layers 11, 21, 31, 41 and 51 and the flexural modulus of elasticity of the hard layers 12, 22, 32, 42 and 52.

(5. Multilayer Tube 4 of Fourth Example)

Figure 5:
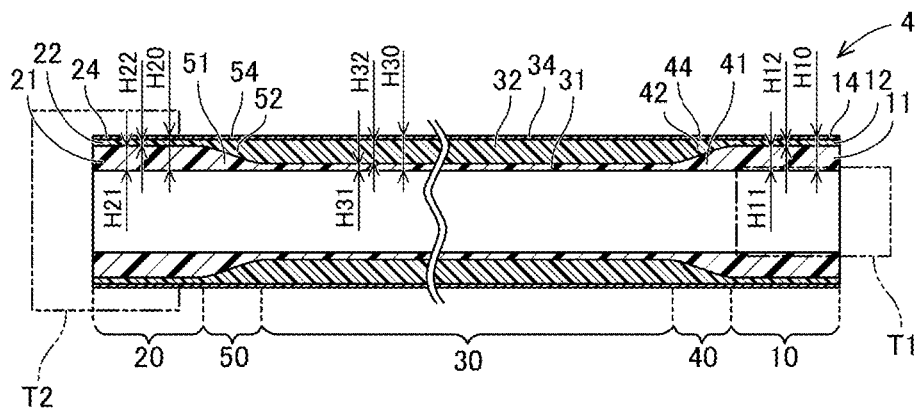
FIG. 5 is an enlarged cross-sectional view of a multilayer tube of a fourth example.

A multilayer tube 4 of a fourth example will be described with reference to FIG. 5. The multilayer tube 4 of the fourth example includes tubular protective layers 14, 24, 34, 44 and 54, in addition to the multilayer tube 1 of the first example.

The protective layers 14, 24, 34, 44 and 54 are continuously formed throughout the entire length of the multilayer tube 4. The protective layers 14, 24, 34, 44 and 54 are disposed on the outermost layer of the multilayer tube 4 on the side of the outer layer of the hard layers 12, 22, 32, 42 and 52. The protective layers 14, 24, 34, 44 and 54 have a uniform thickness throughout the entire length. The flexural modulus of elasticity of the protective layers 14, 24, 34, 44 and 54 may be smaller than the flexural modulus of elasticity of the hard layers 12, 22, 32, 42 and 52. Accordingly, the protective layers 14, 24, 34, 44 and 54 exhibit the protective function of the multilayer tube 4 throughout the entire length.

(6. Multilayer Tube 5 of Fifth Example)

Figure 6:
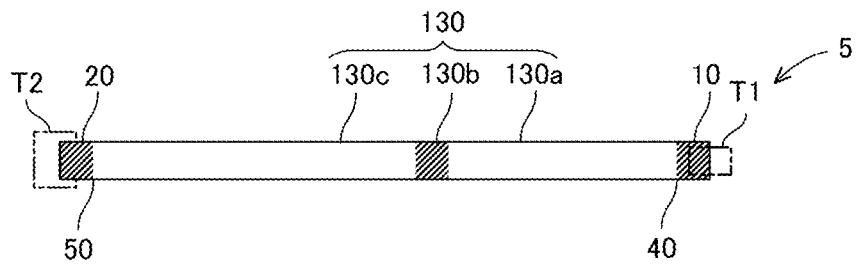
FIG. 6 is a front view of a multilayer tube of a fifth example, in which an area with a thick elastic layer is hatched.

A multilayer tube 5 of a fifth example will be described with reference to FIG. 6. As shown in FIG. 6, the multilayer tube 5 is formed in a linear shape. Here, in FIG. 6, in the hatched area, the elastic layer is thicker than the hard layer, and in the non-hatched area, the elastic layer is thinner than the hard layer. The meaning of presence or absence of the hatching is also the same in FIGS. 7 to 10.

Specifically, the multilayer tube 5 includes a first end portion 10, a second end portion 20, an intermediate part 130, a first connecting part 40 and a second connecting part 50. The first end portion 10 and the second end portion 20 in any one of the multilayer tubes 1 to 4 of the first example to the fourth example can be applied as the first end portion 10 and the second end portion 20. That is, the first end portion 10 and the second end portion 20 are formed such that the elastic layers 11 and 21 are thicker than the hard layers 12 and 22.

The intermediate part 130 is constituted by a linear part having a non-bellows shape. Here, the intermediate part 30 of the multilayer tubes 1 to 4 of the first example to the fourth example is formed such that the elastic layer 31 is thinner than the hard layer 32 throughout the entire length. On the other hand, the intermediate part 130 of the multilayer tube 5 of the fifth example includes areas 130*a* and 130*c* in which elastic layers are thinner than hard layer, and an area 130*b* in which an elastic layer is thicker than the hard layer. Meaning of the elastic layer and the hard layer is as described in the multilayer tubes 1 to 4 of the first example to the fourth example. The first connecting part 40 and the second connecting part 50 are configured similarly to the first connecting part 40 and the second connecting part 50 in the multilayer tubes 1 to 4 from the first example to the fourth example.

The area 130*b* in which an elastic layer has a great thickness is disposed in, for example, an area having a relatively high impact resistance, and can function as an impact-resistant part. Meanwhile, the areas 130*a* and 130*c* in which an elastic layer has a small thickness is disposed in, for example, an area having a relatively low impact resistance, and can function as a normal part.

(7. Multilayer Tube 6 of Sixth Example)

Figure 7:
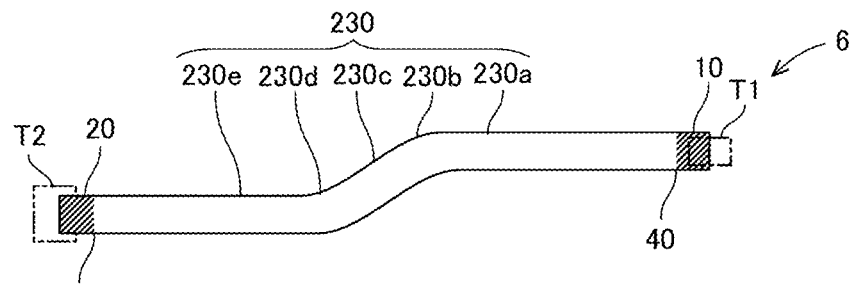
FIG. 7 is a front view of a multilayer tube of a sixth example, in which an area with a thick elastic layer is hatched.

A multilayer tube 6 of a sixth example will be described with reference to FIG. 7. The multilayer tube 6 includes a first end portion 10, a second end portion 20, an intermediate part 230, a first connecting part 40 and a second connecting part 50. The first end portion 10, the second end portion 20, the first connecting part 40 and the second connecting part 50 in any one of the multilayer tubes 1 to 4 of the first example to the fourth example can be applied as the first end portion 10, the second end portion 20, the first connecting part 40 and the second connecting part 50.

Here, the intermediate part 30 of the multilayer tubes 1 to 4 of the first example to the fourth example is constituted by a linear part having a non-bellows shape. On the other hand, the intermediate part 230 of the multilayer tube 6 of the sixth example includes curved parts 230*b* and 230*d* having a non-bellows shape, and linear parts 230*a*, 230*c* and 230*e* having a non-bellows shape. Further, the number of curved places may be appropriately changed. Then, the curved parts 230*b* and 230*d* and the linear parts 230*a*, 230*c* and 230*e* are formed such that the elastic layer is thinner than the hard layer. That is, in the intermediate part 230, the elastic layer is thinner than the hard layer throughout the entire length.

In the example, the curved parts 230*b* and 230*d* and the linear parts 230*a*, 230*c* and 230*e* have the same inner diameter and outer diameter, and both of the curved parts 230*b* and 230*d* and the linear parts 230*a*, 230*c* and 230*e* can also have the desired strength and flexural modulus of elasticity.

(8. Multilayer Tube 7 of Seventh Example)

Figure 8:
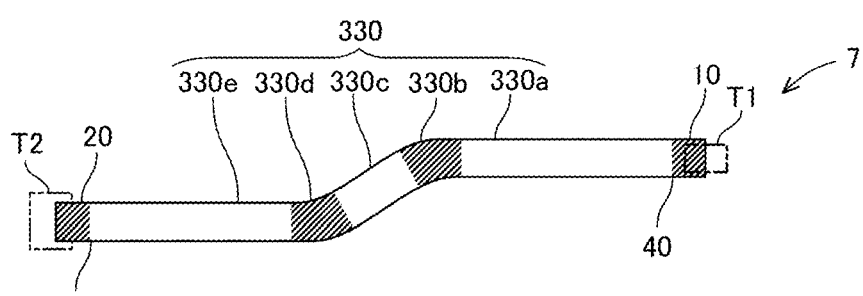
FIG. 8 is a front view of a multilayer tube of a seventh example, in which an area with a thick elastic layer is hatched.
Figure 9:
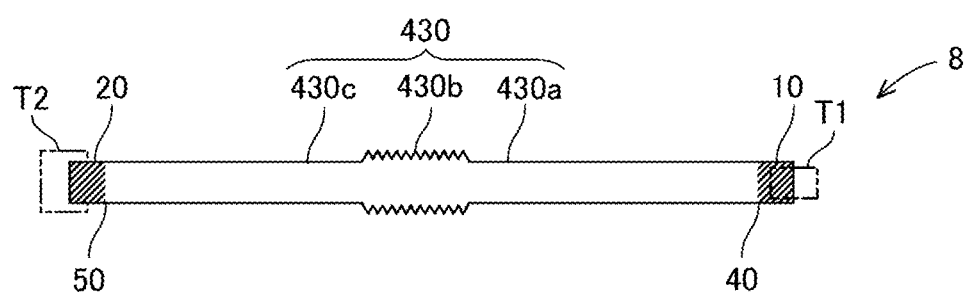
FIG. 9 is a front view of a multilayer tube of an eighth example, in which an area with a thick elastic layer is hatched.

A multilayer tube 7 of a seventh example will be described with reference to FIG. 8. The multilayer tube 7 includes a first end portion 10, a second end portion 20, an intermediate part 330, a first connecting part 40 and a second connecting part 50. The first end portion 10, the second end portion 20, the first connecting part 40 and the second connecting part 50 in any one of the multilayer tubes 1 to 4 of the first example to the fourth example can be applied as the first end portion 10, the second end portion 20, the first connecting part 40 and the second connecting part 50.

The intermediate part 330 of the multilayer tube 7 of the seventh example includes curved parts 330*b* and 330*d* having a non-bellows shape, and linear parts 330*a*, 330*c* and 330*e* having a non-bellows shape. Further, the number of curved places may be appropriately changed. Then, the linear parts 330*a*, 330*c* and 330*e* are formed such that the elastic layer is thinner than the hard layer. Meanwhile, the curved parts 330*b* and 330*d* are formed such that the elastic layer is thicker than the hard layer. That is, in the intermediate part 330, a thickness of the elastic layer and a thickness of the hard layer are varied. Accordingly, the curved parts 330*b* and 330*d* are easily formed.

(9. Multilayer Tube 8 of Eighth Example) A multilayer tube 8 of an eighth example will be described with reference to FIG. 9. The multilayer tube 8 includes a first end portion 10, a second end portion 20, an intermediate part 430, a first connecting part 40 and a second connecting part 50. The first end portion 10, the second end portion 20, the first connecting part 40 and the second connecting part 50 in any one of the multilayer tubes 1 to 4 of the first example to the fourth example can be applied as the first end portion 10, the second end portion 20, the first connecting part 40 and the second connecting part 50.

Here, the intermediate part 30 of the multilayer tubes 1 to 4 of the first example to the fourth example is formed in the non-bellows shape throughout the entire length. On the other hand, the multilayer tube 8 of the eighth example includes a bellows part 430*b* and non-bellows parts 430*a* and 430*c*. Further, the number of bellows portions can be appropriately changed.

Then, the bellows part 430*b* and the non-bellows parts 430*a* and 430*c* are formed such that the thickness of the elastic layer is thinner than the thickness of the hard layer throughout the entire length. That is, the intermediate part 430 is formed such that the elastic layer is thinner than the hard layer throughout the entire length. Accordingly, the multilayer tube 8 includes the bellows part 430*b* and the non-bellows parts 430*a* and 430*c* having a certain level of hardness.

(10. Multilayer Tube 9 of Ninth Example)

Figure 10:
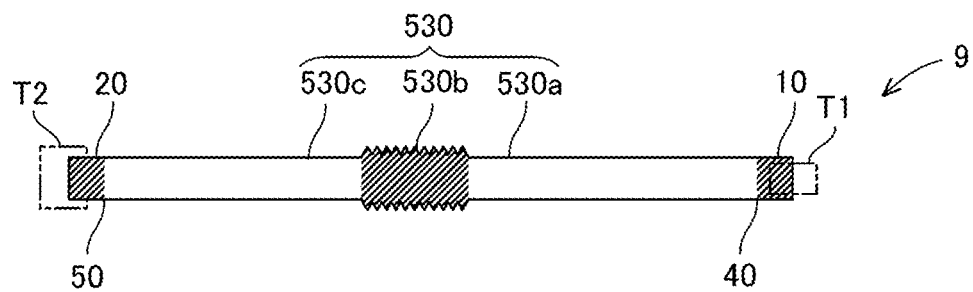
FIG. 10 is a front view of a multilayer tube of a ninth example, in which an area with a thick elastic layer is hatched.

A multilayer tube 9 of a ninth example will be described with reference to FIG. 10. The multilayer tube 9 includes a first end portion 10, a second end portion 20, an intermediate part 530, a first connecting part 40 and a second connecting part 50. The first end portion 10, the second end portion 20, the first connecting part 40 and the second connecting part 50 in any one of the multilayer tubes 1 to 4 from the first example to the fourth example can be applied as the first end portion 10, the second end portion 20, the first connecting part 40 and the second connecting part 50.

The intermediate part 530 of the multilayer tube 9 of the ninth example includes a bellows part 530b, and non-bellows parts 530a and 530c. Further, the number of bellows portions can be appropriately changed. Then, the non-bellows parts 530a and 530c are formed such that the elastic layer is thinner than the hard layer. Meanwhile, the bellows part 530b is formed such that the elastic layer is thicker than the hard layer. That is, in the intermediate part 530, the thickness of the elastic layer and the thickness of the hard layer are varied. Accordingly, the bellows part 530b can be easily molded.

(11. Others)

Further, in the example, the case in which the intermediate parts 30, 130, 230, 330, 430 and 530 of the multilayer tubes 1 to 9 in the longitudinal direction have areas formed such that the thickness of the elastic layer is smaller than the thickness of the hard layer has been exemplarily described. However, the case is not limited to the configuration, and the area in which the intermediate parts 30, 130, 230, 330, 430 and 530 of the multilayer tubes 1 to 9 in the longitudinal direction are formed such that the thickness of the elastic layer is thinner than the thickness of the hard layer may not be provided. That is, when the thickness of the elastic layer and the thickness of the hard layer are varied in the longitudinal direction of the multilayer tubes 1 to 9, the tube may be formed such that the thickness of the elastic layer is greater than the thickness of the hard layer throughout the entire length.

What is claimed is:

1. A multilayer tube applied to pipelines for an automobile, wherein the multilayer tube is formed of an organic material,
the multilayer tube has:
a first end portion that is connected to a first mating member by inserting the first mating member into the first end portion or by sleeving the first mating member on the first end portion; and
an intermediate part connected to the first end portion, and the multilayer tube comprises:
an elastic layer formed throughout the entire length of the multilayer tube and having a determined flexural modulus of elasticity; and
a hard layer formed throughout the entire length of the multilayer tube, having a flexural modulus of elasticity higher than that of the elastic layer and disposed radially outward from the elastic layer,
wherein, in a longitudinal direction of the multilayer tube, each of a thickness of the elastic layer and a thickness of the hard layer is varied,
the first end portion of the multilayer tube is formed such that the thickness of the elastic layer is greater than the thickness of the hard layer,
the intermediate part of the multilayer tube in the longitudinal direction has a portion formed such that the thickness of the elastic layer is thinner than the thickness of the hard layer in the longitudinal direction,
a total thickness of the first end portion is greater than a total thickness of the intermediate part,
the thickness of the hard layer in the first end portion is smaller than the thickness of the hard layer in the intermediate part, and
a ratio of the thickness of the elastic layer to the total thickness of the first end portion in the first end portion is greater than a ratio of the thickness of the hard layer to the total thickness of the intermediate part in the intermediate part.

2. The multilayer tube according to claim 1, wherein the first end portion is connected to the first mating member that is a male member by inserting the first mating member into the first end portion, and
the first end portion is connected to the first mating member in a state in which the elastic layer is compressed in a radial direction by an inner circumferential surface of the hard layer and an outer circumferential surface of the first mating member.

3. The multilayer tube according to claim 1, wherein the first end portion has bendable flexibility.

4. The multilayer tube according to claim 1, wherein the first end portion is connected to the first mating member that is a female member by sleeving the first mating member on the first end portion and has bendable flexibility, and
the hard layer is welded or locked to the first mating member in the first end portion.

5. The multilayer tube according to claim 1, wherein a second end portion of the multilayer tube is connected to a second mating member by inserting the second mating member into the second end portion or by sleeving the second mating member on the second end portion, and
the second end portion is formed such that the thickness of the elastic layer is thicker than the thickness of the hard layer.

6. The multilayer tube according to claim 5, wherein the second end portion is connected to the second mating member that is a male member by inserting the second mating member into the second end portion, and
the second end portion is connected to the second mating member in a state in which the elastic layer is compressed in the radial direction by outer circumferential surfaces of the hard layer and the second mating member.

7. The multilayer tube according to claim 5, wherein a total thickness of the second end portion is greater than a total thickness of the intermediate part,
a thickness of the hard layer in the second end portion is smaller than a thickness of the hard layer in the intermediate part, and
a ratio of the thickness of the elastic layer with respect to the total thickness of the second end portion in the second end portion is greater than a ratio of the thickness of the hard layer with respect to the total thickness of the intermediate part in the intermediate part.

8. The multilayer tube according to claim 5, wherein the second end portion has bendable flexibility.

9. The multilayer tube according to claim 5, wherein the second end portion is connected to the second mating member that is a female member by sleeving the second mating member on the second end portion, and has bendable flexibility; and
the hard layer is welded or locked to the second mating member in the second end portion.

10. The multilayer tube according to claim 1, wherein the intermediate part is formed in a non-bellows shape throughout the entire length and formed such that the thickness of the elastic layer is smaller than the thickness of the hard layer throughout the entire length.

11. The multilayer tube according to claim 10, wherein the intermediate part includes a curved part having a non-bellows shape and a linear part having a non-bellows shape, and
the curved part and the linear part are formed such that the thickness of the elastic layer is smaller than the thickness of the hard layer throughout the entire length.

12. The multilayer tube according to claim 1, wherein
the intermediate part comprises a bellows part and a non-bellows part, and
the bellows part and the non-bellows part are formed such that the thickness of the elastic layer is smaller than the thickness of the hard layer throughout the entire length.

13. The multilayer tube according to claim 1, wherein the intermediate part comprises:
a curved part formed in a non-bellows shape and formed such that the thickness of the elastic layer is greater than the thickness of the hard layer; and
a linear part formed in a non-bellows shape and formed such that the thickness of the elastic layer is smaller than the thickness of the hard layer.

14. The multilayer tube according to claim 1, wherein the intermediate part comprises:
a bellows part formed such that the thickness of the elastic layer is greater than the thickness of the hard layer; and
a non-bellows part formed such that the thickness of the elastic layer is smaller than the thickness of the hard layer.

15. The multilayer tube according to claim 1, wherein the intermediate part comprises:
an impact-resistant part disposed in a first area and formed such that the thickness of the elastic layer is greater than the thickness of the hard layer; and
a normal part disposed in a second area having a lower impact resistance than that of the first area and formed such that the thickness of the elastic layer is smaller than the thickness of the hard layer.

16. The multilayer tube according to claim 1, wherein the multilayer tube further comprises an adhesive layer formed throughout the entire length of the multilayer tube, formed between the elastic layer and the hard layer and configured to attach the elastic layer to the hard layer.

17. The multilayer tube according to claim 1, wherein the multilayer tube further comprises a protective layer formed throughout the entire length of the multilayer tube and disposed as an outermost layer on the side of the hard layer.

* * * * *